(No Model.)

R. M. COLLARD.
COMBINED MATCH BOX AND CIGAR CUTTER.

No. 311,230. Patented Jan. 27, 1885.

Witnesses:
Jas. F. DuHamel
Walter S. Dodge

Inventor:
R. M. Collard.
by Dodge & Son,
Attys.

N. PETERS. Photo-Lithographer, Washington, D. C.

UNITED STATES PATENT OFFICE.

RICHARD M. COLLARD, OF NEW YORK, N. Y., ASSIGNOR TO LE ROY W. FAIRCHILD, OF SAME PLACE.

COMBINED MATCH-BOX AND CIGAR-CUTTER.

SPECIFICATION forming part of Letters Patent No. 311,230, dated January 27, 1885.

Application filed June 9, 1884. (No model.)

*To all whom it may concern:*

Be it known that I, RICHARD M. COLLARD, of New York, in the county of New York and State of New York, have invented certain new and useful Improvements in a Combined Match-Box and Cigar-Cutter, of which the following is a specification.

My invention relates to a combined match-box and cigar-cutter; and the invention consists in the novel construction and arrangement of the various parts, as hereinafter more fully described.

Figure 1:
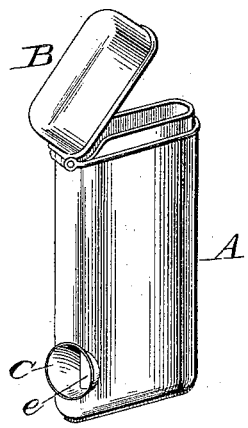
Figure 2:
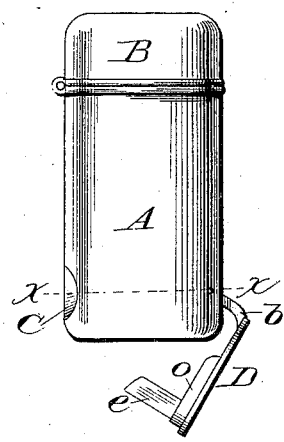
Figure 3:
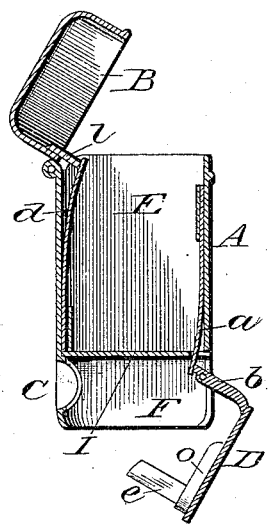
Figure 4:

Figure 1 is a perspective view showing the match-box open. Fig. 2 is a side elevation showing the cutter opened ready for operation. Fig. 3 is a central longitudinal section; and Fig. 4 is a transverse section on the line $xx$ of Fig. 2, with the cutter closed.

The object of this invention is to provide a box for carrying matches and a device for cutting the ends of cigars, and to so combine these articles as to produce an efficient and at the same time a neat and convenient box for carrying in the pocket.

To construct my improved device I make a box, A, of a flat oval form transversely, as shown in the drawings, and to one end hinge a lid, B, to which is secured an arm or projection, $l$, arranged to bear against a spring, $d$, as shown in Fig. 3, by which the lid is both closed automatically after being moved a certain distance, and is held closed without the aid of any catch or other device than the spring bearing against the arm $l$. Near the opposite end the box is provided with a transverse partition, I, as shown in Fig. 3, thus forming within the body of the box two chambers, the larger one, E, being designed for holding matches, and the smaller one, F, for the cutting device. In the edge of the box in the smaller chamber or compartment, F, I insert and secure a cup-shaped piece, C, of proper size to receive and hold the pointed end of a cigar, the inner or bottom portion of which is cut away in a V form longitudinally of the box, as shown in Figs. 3 and 4. I then provide a flat lid, D, of the proper size and shape to close the outer end of the compartment F, preferably drawing in the walls of the chamber F a little at their extremity, as shown in Fig. 3, so as to give them a rounded form externally, and thus prevent the formation of any sharp corners or angles externally, and thus better adapt the box for being carried in the pocket, the lid B having its extremity rounded in a similar manner. To this lid D, I secure a V-shaped blade, $e$, in the position shown in Figs. 2 and 3, so that when the lid D is closed the blade or cutter $e$ will rest in the V-shaped recess cut in the bottom of the cigar cup or holder C, as shown clearly in Figs. 1 and 4. The free end of the cutter $e$ is provided with a sharp cutting-edge, which is also inclined from the apex of the V backward on each side, so as to produce an inclined cutting-edge, by which the apex of the blade is made to commence cutting first, and thereby causing it to cut the cigar with less liability of crushing or breaking the same. This lid D, with the cutter $e$ attached, is pivoted to the back edge of the box by an angular arm, $b$, which works in a slot cut for it in the wall of the box, as shown in Figs. 2 and 3, the extremity of the arm $b$ being arranged to bear against a flat spring, $a$, as shown in Fig. 3, which causes the lid to close automatically, and remain closed the same as the cover B, as above described, the end of the arm $b$ where it bears against the spring when open being beveled, so as to hold the lid open, as shown in Fig. 3, until moved slightly by the hand, when it will fly shut with a quick movement, causing the cutter to act like the blade of a spring-lance. A small flange, $o$, is preferably secured to the inner face of the lid D, and made to extend part of the way around the same, as shown in Figs. 2 and 3, it being so located as to shut within the walls of the chamber F, thereby steadying and holding the lid D more securely and exactly in position, and preventing any lateral movement of the same when the joint has become loose by wear. By pivoting the lid with its cutter at a point opposite the center of the holder or cup C, as shown, instead of at the edge or extremity of the box, the edge of the cutter $e$ is made to pass close to the inner edge of the cup as it is closed, and as by that means the cigar is supported close up to the cutting-edge during the operation of cutting, the danger of crushing or breaking the cigar is greatly lessened, and this is specially important with cigars which have become very dry, as they are easily fractured. The springs $a$ and $d$ are made rather stiffer than usual, because they are designed to hold the cover and lid shut without the aid of any catch or other fastening device. This is the more important in the case of the spring $a$, which operates the cutter, because it is desired to impart to the cutter a sufficient force or momentum to insure its cutting through the tip of any and all cigars, and the more quickly the blade can be made to make its cut the less liability there will be of its crushing or fracturing the cigar and leaving it with a ragged end, which is exceedingly objectionable to smokers.

The device thus constructed makes a very convenient, neat, and efficient match-box and cigar-cutter. The manner of using it is obvious, at least so far as the match-box is concerned, while to use it as a cigar-cutter it is only necessary to raise the lid D to the position shown in Fig. 3, insert the point of the cigar in the cup or holder C, and then give the lid a slight push, when the spring $a$ will cause it to snap shut, and carrying the cutter past the inner edge of the holder C the cutter will cut a V-shaped notch in the point of the cigar.

I am aware that combined match-boxes and cigar-cutters have before been patented, and also that V-shaped blades have been used in cigar-cutters, and therefore I make no claim to such devices, broadly; but, Having fully described my invention, what I claim is—

1. The combined match-box and cigar-cutter consisting of the box A, divided by a transverse partition, I, with the hinged cover B at one end, and the cup-shaped cigar-holder C, and hinged lid D, having the V-shaped cutter $e$ secured thereto at the opposite end, all constructed and arranged to operate substantially as shown and described.

2. The box A, having the holder C, secured in one side, in combination with the lid D, having the blade $e$ rigidly attached thereto, said lid being pivoted to the opposite side of the box by the angular arm $b$ at a point opposite the center of the holder C, or substantially so, substantially as and for the purpose set forth.

RICHARD M. COLLARD.

Witnesses:
J. H. NEWMAN,
HARRY P. FAIRCHILD.